Oct. 21, 1952     L. BORDWELL     2,614,818
BEATER
Filed May 11, 1950
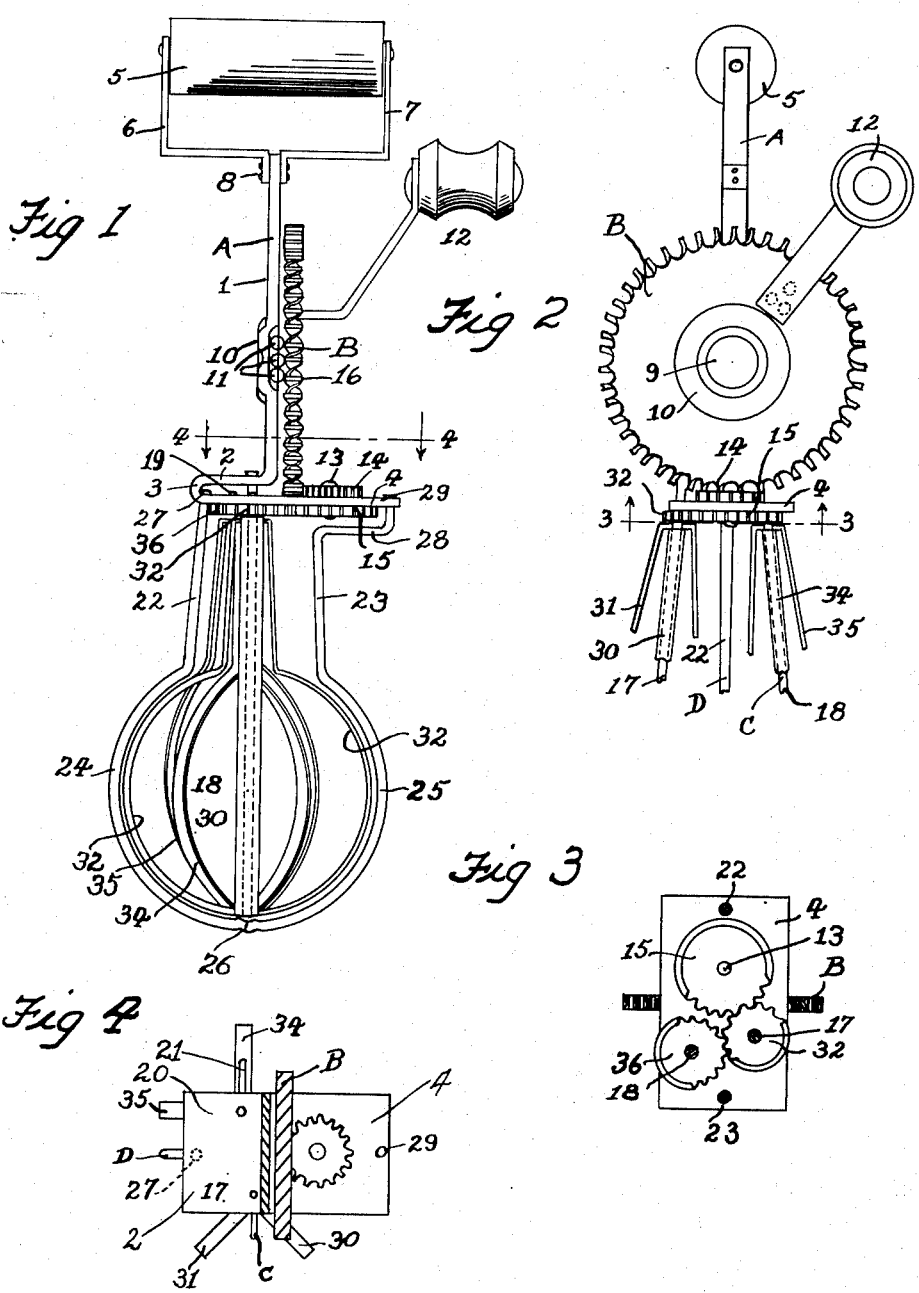
INVENTOR.
*L. BORDWELL*
BY
*Wm H. Pattison*
ATTORNEY Patented Oct. 21, 1952

2,614,818

UNITED STATES PATENT OFFICE 2,614,818

BEATER

Lavern Bordwell, New York, N. Y., assignor to
United Royalties Corporation, New York, N. Y.,
a corporation of New York Application May 11, 1950, Serial No. 161,345

2 Claims. (Cl. 259—131)

This invention relates to improvements in beaters of the type more particularly and specifically intended for household use in beating eggs, dressing, whipping cream or the like, although it is not limited to these particular uses, and is directed more specifically to an improved drive for the beater blades of such a beater.

A feature and object of the invention is the provision of an improved drive for the blades of a beater.

A further object of the invention is the provision of a beater embodying an improved drive for the beater blades and constructed in a manner which will permit rapid and comparatively cheap manufacture and assembly of the beater to the end that the same may be sold at a comparatively small cost.

A still further object of the invention is the provision of a beater embodying the enumerated improved features which is durable and substantially free from mechanical troubles when in use.

Additional advantages and improved features of construction will appear from the following description when read in the light of the accompanying drawings.

In the drawings:

Fig. 1 is a view in side elevation of a beater embodying the invention.

Fig. 2 is a view in side elevation of the upper end of the beater, the operating wheel or gear appearing in side view.

Fig. 3 is a horizontal sectional view on the line 3—3 of Fig. 2 looking upward as indicated by arrows.

Fig. 4 is a horizontal sectional view on the line 4—4 of Fig. 1 looking downward as indicated by arrows.

Having reference to the drawings which illustrate an embodiment of the invention concept, A is a metallic frame bent or otherwise formed to provide a substantially straight vertically extending leg or shank 1 the lower end of which extends outwardly at right angles, as at 2, and is then bent downwardly and reversely at 3 to provide a base 4 which parallels but is in spaced relationship to the frame portion 2 and is of much greater length in that it extends to both sides of the shank or leg 1.

A handle 5 is preferably rotatably mounted in a yoke made up or two yoke elements 6 and 7 suitably secured as at 8 to the upper end of the frame leg 1.

An operating wheel or gear B is mounted on the frame to rotate about a suitable horizontal pivot 9 and for ease in operation the leg is offset as at 10 for the reception and support of ball bearings 11 interposed between the leg and the inner face of the operating gear. A suitable operating handle 12 is provided for manual rotation of the gear B.

A shaft 13 extends vertically through the frame base 4 and is disposed at that side of the frame leg upon which the operating gear is disposed. A small gear 14, disposed above the frame base, is secured to and rotates this shaft while a second and larger gear 15 secured to and rotatable with the shaft is disposed below the frame base. The gear 14 has engagement with the teeth 16 of the operating gear or wheel B and is driven thereby.

The beater illustrated embodies two pairs of beaters each made up of a pair of beater blades. Each pair of beaters is rotatable about one of the pair of vertically extending legs 17 and 18 of a wire or rod C. The upper ends 19 and 20 of these rods extend through the frame base 4 and the frame leg 2 and are suitably secured thereto. The lower ends of the legs 17 and 18 are secured together by a cross element 21 which is preferably a part of the rod so that the rod is continuous throughout its length.

A second rod D is made up of vertically extending upper end portions 22 and 23 which have their lower ends outwardly bowed as at 24 and 25 and secured together. The cross element of the first rod C crosses and is suitably secured as at 26 to the rod D at its bottom. The rod portion 22 has its upper end 27 suitably secured in the frame base and its other end is bent at right angles as at 28 and then extends to and is secured as at 29 in the frame base.

The lower ends of the beater blades 30 and 31 of one beater are rotatable about the lower end of the rod leg 17 while their upper ends are rotatable about the upper end of said leg and carry a small gear 32, affixed against rotation in respect to the blades, which meshes as at 33 with the gear 15. The other beater blades 34 and 35 have their lower ends rotatable about the lower end of the other wire arm 18 and their upper ends rotatable about the upper end of said arm. A gear 36 is affixed to the upper ends of these blades against rotation and meshes, at at 37, with the gear 32.

From the description given it will be seen that upon rotation of the drive gear 16 the gear 14 is revolved which in turn revolves the shaft 13 and the gear 15. The gear 15 rotates the gear 32 which in turn rotates the gear 36. Rotation of the gears 32 and 36 rotate or spin the beater blades. The rotation of the beaters is in opposite directions to one another.

The construction provides a beater in which rapid or accelerated rotation of the beater blades is obtained even when the main operating gear B is slowly rotated. Thus rapid and efficient beating can be obtained with the minimum of physical effort as compared with beaters not provided with the present gear arrangement as for instance beaters driven by a gear arrangement such as that illustrated and described in my prior Patent No. 1,709,768 of April 16, 1929.

What I claim is:

1. In a beater, a frame having a shank portion the lower end of which is bent into a U-shape to provide an upper short leg and a lower long leg arranged in spaced parallel relationship and disposed in substantially horizontal planes when the beater is in use, the long leg comprising a base and the shank extending at right angles thereto from a point substantially intermediate the length of the base, a holding handle connected to the upper end of the shank and paralleling the base and being disposed above the same, a pair of rotatably mounted beaters supported from and disposed below the base and each being provided with a similar sized gear, said beater gears being disposed beneath one end of the base and meshing with one another to rotate the beaters in opposite directions, a freely rotatable shaft extending through the opposite end of the base and provided above the base with an upper gear and below the base with a lower gear larger in size than the upper gear, said lower larger gear meshing with one only of the beater gears, a main drive gear wheel larger than any of the aforementioned gears rotatably mounted on the shank and operatively meshing with the upper small gear carried by the aforementioned shaft, and an operating handle secured to the main drive gear wheel for rotating the same and through said chain of gears rotating the beater blades at a speed much in excess of the speed of rotation of the main drive gear wheel.

2. In a beater, a frame having a shank portion the lower end of which is bent into a U-shape to provide an upper short leg and a lower long leg arranged in spaced parallel relationship, and disposed in substantially horizontal planes when the beater is in use, the long leg comprising a base and the shank extending at right angles thereto from a point substantially intermediate the length of the base, a holding handle connected to the upper end of the shank and paralleling the base and being disposed above the same, a pair of rotatably mounted beaters supported from and disposed below the base and each being provided with a similar sized gear, said beater gears being disposed beneath one end of the base and meshing with one another to rotate the beaters in opposite directions, a freely rotatable shaft extending through the opposite end of the base and provided above the base with an upper gear and below the base with a lower gear, said lower gear meshing with one only of the beater gears, a main drive gear wheel mounted on the shank and operatively meshing with the upper gear carried by the aforementioned shaft, and an operating handle secured to the main drive gear wheel for rotating the same and through said chain of gears rotating the beater blades at a speed much in excess of the speed of rotation of the main drive gear wheel.

LAVERN BORDWELL.

REFERENCES CITED

The following references are of record in the file of this patent:

UNITED STATES PATENTS

| Number | Name | Date |
|---|---|---|
| 467,328 | Eichenberg | Jan. 19, 1892 |
| 1,465,940 | Hazzard | Aug. 28, 1923 |
| 1,982,531 | Nash | Nov. 27, 1934 |

FOREIGN PATENTS

| Number | Country | Date |
|---|---|---|
| 26,785 | Switzerland | Aug. 11, 1902 |